(12) United States Patent
Takahara

(10) Patent No.: US 12,704,168 B2
(45) Date of Patent: Aug. 11, 2026

(54) BELT

(71) Applicant: BANDO CHEMICAL INDUSTRIES, LTD., Hyogo (JP)

(72) Inventor: Masato Takahara, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 60 days.

(21) Appl. No.: 18/710,609

(22) PCT Filed: Nov. 7, 2022

(86) PCT No.: PCT/JP2022/041344
§ 371 (c)(1),
(2) Date: Dec. 1, 2024

(87) PCT Pub. No.: WO2023/090185
PCT Pub. Date: May 25, 2023

(65) Prior Publication Data
US 2025/0327504 A1 Oct. 23, 2025

(30) Foreign Application Priority Data
Nov. 16, 2021 (JP) ................................ 2021-186219

(51) Int. Cl.
*F16G 1/08* (2006.01)
*F16G 1/28* (2006.01)

(52) U.S. Cl.
CPC ................ *F16G 1/08* (2013.01); *F16G 1/28* (2013.01)

(58) Field of Classification Search
CPC ..... F16G 1/08; F16G 1/28; F16G 1/10; F16G 1/12; F16G 1/16; H01B 7/08
See application file for complete search history.

(56) References Cited

U.S. PATENT DOCUMENTS

| | | | | |
|---|---|---|---|---|
| 10,882,719 | B2 * | 1/2021 | Dudde | B66B 7/062 |
| 10,964,484 | B2 * | 3/2021 | Ikegaya | B60R 16/0207 |
| 11,613,846 | B2 * | 3/2023 | Morren | D07B 1/0626 57/212 |
| 2015/0285334 | A1 * | 10/2015 | Thomas | F16G 1/10 474/90 |
| 2018/0308639 | A1 * | 10/2018 | Ikegaya | B60R 16/0207 |
| 2019/0301088 | A1 * | 10/2019 | Dudde | F16G 9/04 |

(Continued)

FOREIGN PATENT DOCUMENTS

| | | |
|---|---|---|
| CN | 105424756 | 3/2016 |
| JP | 2000355055 | 12/2000 |
| JP | 2009-052710 | 3/2009 |

(Continued)

*Primary Examiner* — Henry Y Liu
(74) *Attorney, Agent, or Firm* — JCIPRNET

(57) ABSTRACT

A belt includes: a belt main body; at least one energizing core cord containing a core wire having electrical conductivity; and at least one reinforcing core cord having an electrical resistance per unit length being greater than that of the energizing core cord, wherein the belt main body has at least one belt hole which penetrates the belt main body in a thickness direction, the energizing core cord and the reinforcing core cord are embedded in the belt main body along a length direction of the belt main body to be spaced apart in a width direction of the belt main body, and each distance between the energizing core cord and a periphery of the belt hole is no less than 0.5 mm.

15 Claims, 3 Drawing Sheets

(56) References Cited

U.S. PATENT DOCUMENTS

| | | | | |
|---|---|---|---|---|
| 2020/0270809 | A1* | 8/2020 | Morren ................ | D07B 1/0613 |
| 2021/0024327 | A1* | 1/2021 | Feldhusen ................ | F16G 9/04 |

FOREIGN PATENT DOCUMENTS

| | | |
|---|---|---|
| JP | 2017036829 | 2/2017 |
| JP | 2019-060403 | 4/2019 |
| JP | 2021-055845 | 4/2021 |
| TW | 201608148 | 3/2016 |
| WO | 2016002899 | 1/2016 |

* cited by examiner

BELT

TECHNICAL FIELD

The present invention relates to a belt.

BACKGROUND ART

There are cases in which a belt is used in raising/lowering and/or conveying articles at a factory, a warehouse, and/or the like. In such cases, for example, a dolly is secured to a belt by screw(s) via through-hole(s) drilled in the belt, and this dolly is moved up/down or left/right by a rotating operation of a pulley which drives the belt. The articles are loaded on the dolly and raised/lowered and/or conveyed.

As the dolly, for example, there is one having a stopper installed thereon so that a burden that has been loaded thereon does not slide off from the dolly. This stopper may be storably electrically controlled so as not to be a hindrance at a time of mounting a burden onto the dolly and/or a time of unloading a burden. Thus, it is not uncommon for the dolly to have an additional function which is controlled by electric means.

A belt in which wiring for electric signals and power for controlling such an additional function (hereinafter, may be also referred to as merely "wiring") is also used as core cords has been proposed (see Japanese Unexamined Patent Application, Publication No. 2019-60403). In this belt, since a material capable of energizing is used as the core cords, the core cords are also used as power supply cables. Thus, the wiring can be embedded in the belt while inhibiting an increase in thickness of the belt.

PRIOR ART DOCUMENTS

Patent Documents

Patent Document 1: Japanese Unexamined Patent Application, Publication No. 2019-60403

SUMMARY OF THE INVENTION

Problems to be Solved by the Invention

In a case in which the core cords of the belt are also used as the wiring, the number of the core cords is determined by adopting whichever is greater of: the number of core cords determined by the strength needed for the belt; and the number of wiring lines needed. Therefore, when the number of wiring lines becomes greater, the number of core cords is determined by the number wiring lines, and a width of the belt is susceptible to becoming unduly large. When the width of the belt becomes unduly large, miniaturization of an apparatus, e.g., a dolly, into which this belt is to be incorporated may become difficult.

The present invention was made in view of such disadvantages, and it is an object of the present invention to provide a belt which enables inhibiting an increase in width while securing the number of core cords needed as wiring for electric signals and power.

Means for Solving the Problems

A belt according to one aspect of the present invention includes: a belt main body; at least one energizing core cord containing a core wire having electrical conductivity; and at least one reinforcing core cord having an electrical resistance per unit length being greater than that of the energizing core cord, wherein the belt main body has at least one belt hole which penetrates the belt main body in a thickness direction, the energizing core cord and the reinforcing core cord are embedded in the belt main body along a length direction of the belt main body to be spaced apart in a width direction of the belt main body, and each distance between the energizing core cord and a periphery of the belt hole is no less than 0.5 mm.

Effects of the Invention

The belt of the present invention enables inhibiting an increase in width while securing the number of core cords needed as wiring for electric signals and power.

DESCRIPTION OF EMBODIMENTS

Description of Embodiments of Present Invention

Figure 1:
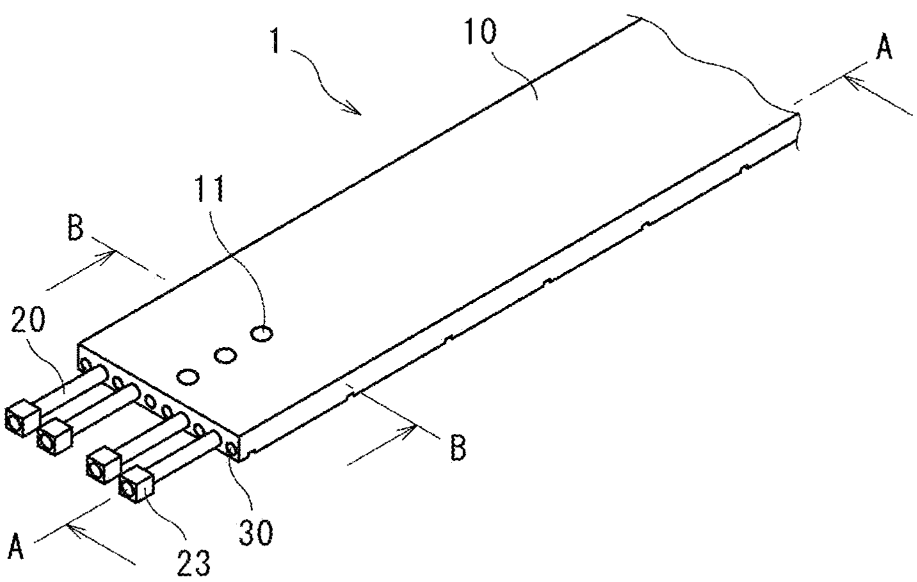
FIG. 1 is a schematic perspective view showing a belt according to one embodiment of the present invention.

First, the embodiments of the present invention are listed and described.

A belt according to one embodiment of the present invention includes: a belt main body; at least one energizing core cord containing a core wire having electrical conductivity; and at least one reinforcing core cord having an electrical resistance per unit length being greater than that of the energizing core cord, wherein the belt main body has at least one belt hole which penetrates the belt main body in a thickness direction, the energizing core cord and the reinforcing core cord are embedded in the belt main body along a length direction of the belt main body to be spaced apart in a width direction of the belt main body, and each distance between the energizing core cord and a periphery of the belt hole is no less than 0.5 mm.

Since the belt involves the electrical resistance per unit length of the energizing core cord being lower than that of the reinforcing core cord, the number of the energizing core cords in parallel for securing the electrical resistance needed for energization can be reduced. Furthermore, the belt enables maintaining strength mainly by means of the reinforcing core cord. Moreover, since in the belt, each distance between the energizing core cord and the periphery of the belt hole is greater than or equal to the lower limit, interference between the energizing core cord and a screw which penetrates the belt hole at a time of using the belt is inhibited. Therefore, the desired electric current value can be easily secured in all of the energizing core cords, whereby effective functioning can be obtained. Thus, since the number of core cords needed can be reduced, the belt enables inhibiting an increase in width while securing the number of core cords needed as wiring for electric signals and power.

It is preferred that core cords positioned on outermost sides in the width direction are each the reinforcing core cord. The core cords positioned on the outermost sides in the width direction may have increasing electrical resistance over time due to, e.g., abrasion resulting from friction from side faces of the belt. Therefore, when the core cords positioned on the outermost sides in the width direction are each the reinforcing core cord and are thus not used as the wiring for electric signals or power, the reliability as wiring can be enhanced.

It is preferred that the belt includes a plurality of energizing core cords as the at least one energizing core cord, and the reinforcing core cord is disposed between the energizing core cords which are adjacent to each other. When the reinforcing core cord is thus disposed between the energizing core cords which are adjacent to each other, strength of the belt unevenly decreasing can be inhibited.

It is preferred that the belt includes a plurality of energizing core cords as the at least one energizing core cord, and a core cord group is formed which comprises no fewer than 2 and no more than 5 of the energizing core cords being adjacent in series. When the core cord group is thus formed, for example, a parallel connection for wiring which requires low resistance, such as, e.g., power wiring or the like, is facilitated. Furthermore, in a case in which the energizing core cords are used in parallel with respect to the same signal, an average distance between the energizing core cords constituting the core cord group can be reduced; thus an increase in the width of the belt can be further inhibited.

It is preferred that the energizing core cord comprises a coating film which constitutes a peripheral surface such that the core wire is coated, and the coating film is not adhered to the belt main body. When adopting the structure in which the energizing core cord is thus not adhered to the belt main body due to the coating film, the energizing core cord being subjected to stress in a lengthwise direction from the belt main body can be avoided, and consequently, changes in electrical properties and/or wire breakages can be inhibited.

The coating film is preferably constituted from an insulator. When the coating film is thus constituted from an insulator, changes in electrical properties when the energizing core cord comes in contact with another energizing core cord or the like can be inhibited.

It is preferred that a melting point of a principal component of the coating film is higher than a melting point of a principal component of the belt main body. When the melting point of the principal component of the coating film is thus higher than the melting point of the principal component of the belt main body, the coating film adhering to the belt main body can be inhibited.

It is preferred that the principal component of the belt main body is an elastomer and the principal component of the coating film is a fluororesin. When the principal component of the belt main body is thus an elastomer and the principal component of the coating film is thus a fluororesin, the coating film can be readily inhibited from adhering to the belt main body.

It is preferred that the belt main body contains a flame retardant. When the belt main body thus contains a flame retardant, the belt main body burning due to heat generated by energization can be more certainly inhibited.

It is preferred that the core wire of the energizing core cord is an annealed copper wire or a copper alloy wire. Copper has a low electrical resistance per unit length, and is thus suitable for an energizing usage. Furthermore, annealed copper wires and copper alloy wires bend easily; thus, occurrence of disadvantages such as wire breakages can be inhibited.

It is preferred that the core wire of the energizing core cord is a solid conductor, a bunch-stranded conductor, or a rope-stranded conductor. When the core wire of the energizing core cord is a solid conductor, a cross section of the core wire has the highest density, whereby the core wire having low resistance is facilitated. Furthermore, when the core wire of the energizing core cord is a bunch-stranded conductor or a rope-stranded conductor, the strength of the core wire can be increased, enabling inhibiting the occurrence of disadvantages such as wire breakages, and flexural fatigue characteristics of the belt can be enhanced.

It is preferred that the energizing core cord is a shielded wire, a cable, or a shielded cable. When the energizing core cord is thus a shielded wire, a cable, or a shielded cable, noise resistance of the energizing core cord can be increased.

It is preferred that the energizing core cord has a connector on at least one end side. When a connector is thus provided on at least one end side of the energizing core cord, wiring between the belt and another apparatus can be easily performed.

It is preferred that the belt is a flat belt. The belt can be suitably used as a flat belt for which an energizing function is necessary.

It is preferred that the belt is a toothed belt having a plurality of toothed portions disposed at equal intervals in the length direction on one face of the belt main body. The belt can be suitably used as a toothed belt for which an energizing function is necessary.

Details of Embodiments of the Present Invention

The belt according to one embodiment of the present invention is described with reference to the drawings.

First Embodiment

Figure 2:
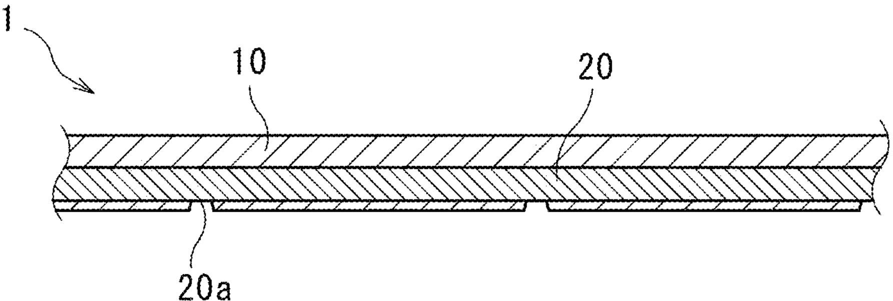
FIG. 2 is a schematic cross-sectional view along an A-A line of the belt shown in FIG. 1.
Figure 3:
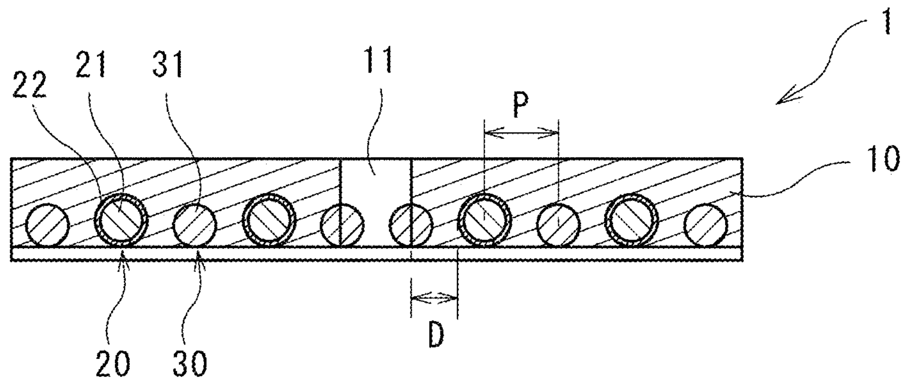
FIG. 3 is a schematic cross-sectional view along a B-B line of the belt shown in FIG. 1.

A belt 1 shown in FIG. 1, FIG. 2, and FIG. 3 includes: a belt main body 10; four energizing core cords 20; and six reinforcing core cords 30. The belt 1 is a flat belt. The belt 1 can be suitably used as a flat belt for which an energizing function is necessary.

Furthermore, the belt main body 10 has one or a plurality of (in FIG. 1, three) belt holes 11 which penetrate the belt main body 10 in a thickness direction, and the energizing core cords 20 and the reinforcing core cords 30 are embedded in the belt main body 10 along a length direction of the belt main body 10 to be spaced apart in a width direction of the belt main body 10.

Belt Main Body

A principal component of the belt main body 10 is a rubber or a resin. Examples of the rubber include: ethylene-α-olefin rubbers such as ethylene propylene rubber (EPR) and ethylene propylene diene monomer rubber (EPDM); chloroprene rubber (CR); chlorosulfonated polyethylene rubber (CSM); hydrogenated nitrile rubber (H-NBR); and the like. The rubber may be one type of these, or may be a blend of two or more types. Examples of the resin include a thermoplastic polyester, a polyamide, a polyurethane, and the like. Of these, the principal component of the belt main body 10 is preferably an elastomer such as the ethylene-α-olefin rubber, a thermoplastic polyurethane, a polyamide, and a polyester, and a thermoplastic urethane, a polyamide, and a polyester are more preferred. Thermoplastic urethanes are superior in a low dust generation property and in abrasion resistance. Polyamides are superior in oil resistance, chemical resistance, and abrasion resistance. Polyesters are superior in water resistance, low-temperature flexibility, strength, and fatigue resistance. As referred to herein, the term "principal component" means a component having the highest content, and refers to a component having a content of preferably no less than 50% by mass, and more preferably no less than 90% by mass.

An average thickness of the belt main body 10 is appropriately determined in accordance with, e.g., the strength required of the belt 1, and can be, for example, no less than 1 mm and no greater than 10 mm.

A width and a length of the belt main body 10 can be appropriately determined in accordance with an intended usage of the belt 1. It is to be noted that the belt 1 is mainly used as an open belt having both ends.

The belt main body 10 may contain various types of additives. Examples of such additives include antioxidants, heat stabilizers, light stabilizers, anti-fogging agents, flame retardants, surface-adjusting agents, pigments, fillers, waxes, and the like.

Of these, the belt main body 10 preferably contains a flame retardant. When the belt main body thus contains a flame retardant, the belt main body burning due to heat generated by energization can be more certainly inhibited. The effect is high particularly when the principal component of the belt main body 10 is the elastomer.

Examples of the flame retardant include: halogen-containing organic compounds such as chlorine-based organic compounds and bromine-based organic compounds; non-halogen-containing organic compounds such as phosphorus-based organic compounds; and the like. Of these, bromine-based organic compounds are preferred, and in particular, decabromodiphenyl ethane (DBDPE) can be exemplified.

The lower limit of a content of the flame retardant with respect to 100 parts by mass of the principal component of the belt main body 10 is preferably 5 parts by mass, and more preferably 15 parts by mass. On the other hand, the upper limit of the content of the flame retardant is preferably 30 parts by mass, and more preferably 20 parts by mass. When the flame retardant is less than the lower limit, an effect of improving the flame-retarding property may be insufficient. Conversely, when the flame retardant is greater than the upper limit, intrinsic properties obtained by means of the principal component of the belt main body 10 may be impeded.

In addition to the flame retardant, the belt main body 10 preferably contains an auxiliary flame retardant. When the belt main body 10 thus contains an auxiliary flame retardant, the effect of improving the flame-retarding property can be more easily expressed. Examples of the auxiliary flame retardant include antimony trioxide.

The lower limit of a content of the auxiliary flame retardant with respect to 100 parts by mass of the principal component of the belt main body 10 is preferably 1 part by mass, and more preferably 5 parts by mass. On the other hand, the upper limit of the content of the auxiliary flame retardant is preferably 20 parts by mass, and more preferably 10 parts by mass. When the auxiliary flame retardant is less than the lower limit, the effect of improving the flame-retarding property may be insufficient. Conversely, when the auxiliary flame retardant is greater than the upper limit, the effect obtained with respect to an increase in the content may become saturated, whereby cost effectiveness may be insufficient.

The belt hole(s) 11 is/are used in order to secure an object to be coupled, e.g., a dolly, to the belt 1, and in particular, for example, screw(s) is/are inserted into the belt hole(s) 11 and fastened to the belt 1. A cross-sectional shape of the belt hole(s) 11 is not particularly limited, and is typically round. Hereinafter, an explanation is provided with the premise that the cross section of the belt hole(s) 11 is round, but this does not exclude other shapes.

The belt hole(s) 11 may be singular, but in order to inhibit rotation of the object to be coupled, is/are preferably provided in a plurality. Furthermore, in accordance with a weight of the object to be coupled, the number of the belt hole(s) 11 may be no less than 3. Alternatively, the belt hole(s) 11 may be provided to be more numerous than the number of fastenings to the object to be coupled, so that attachment site(s) can be adjusted.

The belt hole(s) 11 is/are preferably provided in a central part in a width direction of the belt main body 10. When the belt hole(s) 11 is/are provided in the central part in the width direction of the belt main body 10, the object to be coupled can be stably coupled.

Furthermore, the belt hole(s) 11 is/are typically provided on one end or both ends in the length direction of the belt main body 10. This is because the object to be coupled is often coupled to end(s) in the length direction of the belt main body 10.

In the case in which the plurality of belt holes 11 are provided, the plurality of belt holes 11 are arranged such that centers thereof are aligned along the length direction. Intervals between adjacent belt holes 11 are appropriately provided to enable fastening the object to be coupled. The plurality of belt holes 11 are preferably aligned to have equal intervals. When the plurality of belt holes 11 are thus aligned to have equal intervals, at the time of fastening the object to be coupled, pressure exerted on the main body belt 10 tends to be uniformly dispersed, whereby the pressure being unevenly concentrated and the belt main body 10 becoming damaged can be inhibited.

The lower limit of a diameter of each belt hole 11 is preferably 2 mm, and more preferably 3 mm. On the other hand, the upper limit of the diameter of each belt hole 11 is preferably 7 mm, and more preferably 6 mm. When the diameter of each belt hole 11 is less than the lower limit, it may not be possible to sufficiently secure fastening strength with the object to be coupled. Conversely, when the diameter of each belt hole 11 is greater than the upper limit, the strength of the belt main body 10 near the belt hole(s) 11 may be insufficient, and/or it may not be possible to sufficiently secure the cord number of the energizing core cords 20.

Energizing Core Cords

The energizing core cords 20 each have a wire-shaped body, and, for example, a circular cross section. As shown in FIG. 3, the energizing core cords 20 each contain a core wire 21 which has electrical conductivity, and have a coating film 22 which constitutes a peripheral surface such that the core wire 21 is coated.

Furthermore, as shown in FIG. 1, the energizing core cords 20 preferably each have a connector 23 on at least one end side. The connector 23 is a component for connecting the energizing core cord 20 with a signal wire outside of the belt 1. When the connector 23 is thus provided on at least one end side of each energizing core cord 20, wiring between the belt 1 and another apparatus can be easily performed. It is to be noted that the connector 23 may be provided on both ends of each energizing core cord 20.

It is preferred that the energizing core cords 20 are shielded wires, cables, or shielded cables. When the energizing core cords 20 are thus shielded wires, cables, or shielded cables, noise resistance of the energizing core cords 20 can be increased.

The lower limit of an average diameter of the energizing core cords 20 is preferably 0.2 mm, more preferably 0.5 mm, and still more preferably 1 mm. On the other hand, the upper limit of the average diameter of the energizing core cords 20 is preferably 2.5 mm, and more preferably 1.5 mm. When the average diameter of the energizing core cords 20 is less than the lower limit, the electrical resistance of the energizing core cords 20 may not be sufficiently lowered, and the function for electric signals or power may not be sufficiently fulfilled. Conversely, when the average diameter of the energizing core cords 20 is greater than the upper limit, the width of the belt 1 may become excessively large.

Core Wires

The core wires 21 may be exemplified by steel wires, copper wires, and the like. Of these, copper wires are preferred, and annealed copper wires or copper alloy wires are more preferred. Copper wires have low electrical resistance per unit length, and are thus suitable for an energizing usage. Furthermore, annealed copper wires and copper alloy wires bend easily; thus, occurrence of disadvantages such as wire breakages can be inhibited.

It is preferred that the core wires 21 of the energizing core cords 20 are solid conductors, bunch-stranded conductors, or rope-stranded conductors. When the core wires 21 of the energizing core cords 20 are solid conductors, a cross section of each core wire 21 has the highest density, whereby the core wires 21 having low resistance is facilitated. Furthermore, when the core wires 21 of the energizing core cords 20 are bunch-stranded conductors or rope-stranded conductors, the strength of the core wires 21 can be increased, enabling inhibiting the occurrence of disadvantages such as wire breakages, and flexural fatigue characteristics of the belt 1 can be enhanced.

Coating Film

The coating film 22 is preferably constituted from an insulator. When the coating film 22 is thus constituted from an insulator, changes in electrical properties when the energizing core cord 20 comes in contact with another energizing core cord 20 or the like can be inhibited. Furthermore, since the belt 1 is produced while the energizing core cords 20 are supported from undersides thereof, at the supporting point(s), as shown in FIG. 2, there are cases in which an exposed portion 20*a*, being a part of the energizing core cord 20 which is exposed from the belt main body in the belt 1 after production, is present. Even if the exposed portion 20*a* is thus present, when the coating film 22 constituted from an insulator is included, a short circuit and/or an electric shock can be prevented in a case in which an electric current runs through the energizing core cords 20.

Furthermore, it is preferred that the coating film 22 is not adhered to the belt main body 10. When adopting the structure in which the energizing core cords 20 are thus not adhered to the belt main body 10 due to the coating film 22, the energizing core cords 20 being subjected to stress in a lengthwise direction from the belt main body 10 can be avoided, and consequently, changes in electrical properties and/or wire breakages can be inhibited. Furthermore, when an electric current runs through the energizing core cords, the belt main body being deteriorated or deformed due to heat generated can be prevented. Particularly in the case in which the principal component of the belt main body 10 is the elastomer, the coating film 22 effectively functions against thermal deterioration of the belt main body 10.

It is preferred that a melting point of a principal component of the coating film 22 is higher than a melting point of a principal component of the belt main body 10. When the melting point of the principal component of the coating film 22 is thus higher than the melting point of the principal component of the belt main body 10, the coating film 22 adhering to the belt main body 10 can be inhibited. Furthermore, even in a case in which the energizing core cords 20 reach a high temperature due to, e.g., excessive electric current running through the energizing core cords 20 and the melting temperature of the belt main body 10 is exceeded, as long as the melting temperature of the coating film 22 is not exceeded, the coating film 22 can function as a protective film, and deterioration of and/or damage to the belt main body 10 can be prevented.

The principal component of the coating film 22 is preferably a fluororesin, and is more preferably an ethylene-tetrafluoroethylene copolymer (ETFE). Furthermore, combination with the belt main body 10 having the elastomer as the principal component is preferred. When the principal component of the belt main body 10 is thus the elastomer and the principal component of the coating film 22 is thus a fluororesin, the coating film 22 can be readily inhibited from adhering to the belt main body 10.

Relationship with Belt Hole(s)

As shown in FIG. 3, the belt hole(s) 11 may be provided on the reinforcing core cords 30, described later. In other words, the reinforcing core cords 30 may be cut by the belt hole(s) 11. In this case, the reinforcing core cords 30 reinforce a region in which the belt hole(s) 11 is/are not provided. On the other hand, the belt hole(s) 11 cause an electrical connection to be lost; thus, the belt hole(s) 11 cannot be provided on the energizing core cords 20. Described conversely, the energizing core cords 20 are disposed such that the belt hole(s) 11 is/are avoided.

Here, a distance to separate the energizing core cords 20 from the belt hole(s) 11 is considered. Screw(s) is/are inserted into the belt hole(s) 11, and the object to be coupled and the belt 1 are fastened together. Since an upper face part of the screw(s) is larger in diameter than the belt hole(s) 11, when the screw(s) is/are tightened to secure the object to be coupled to the belt 1, the upper face part of the screw(s) is pressed to the belt 1. At this time, if the energizing core cords 20 are positioned at a region near the upper face part of the screw(s), the resistance of the energizing core cords 20 may change due to this pressing pressure, whereby it may not be possible to obtain the desired electrical characteristics. Therefore, the energizing core cords 20 must be separated a certain distance from the belt hole(s) 11 such that the electrical characteristics do not change due to the pressing force of tightening the screw(s). Specifically, the lower limit of each distance ("distance D" shown in FIG. 3) between the energizing core cords 20 and the belt hole(s) 11 is 0.5 mm, and more preferably 0.7 mm. On the other hand, the upper limit of the distance D is not particularly limited, but in light of a risk of being unable to dispose the necessary number of energizing core cords 20 when the distance D made too large, the upper limit of the distance D can be, for example, 5 mm.

Reinforcing Core Cords

The reinforcing core cords 30 each have a wire-shaped body, and, for example, a circular cross section. The reinforcing core cords 30 each contain a core wire 31, and have a higher electrical resistance per unit length than that of the energizing core cords 20.

The reinforcing core cords 30 may have electrical conductivity, but preferably have an insulation property. When the reinforcing core cords 30 have the insulation property, even in a case of coming into contact with the energizing core cords 20, the electric signal or power function of the energizing core cords 20 is unlikely to be affected. Thus, the intervals between the energizing core cords 20 and the reinforcing core cords 30 can be made smaller, and an increase in the width of the belt 1 tends to be inhibited.

The core wires 31 of the reinforcing core cords 30 can be the same material as that of the core wires 21 of the energizing core cords 20, but the core wires 31 of the reinforcing core cords 30 are preferably a material which differs from that of the core wires 21 of the energizing core cords 20. When the core wires 31 of the reinforcing core cords 30 are thus different from the core wires 21 of the energizing core cords 20, a material having low electrical resistivity can be employed as the core wires 21 of the energizing core cords 20, thereby facilitating reducing the number of the energizing core cords 20 in parallel for securing the necessary electrical resistance. Of these, the core wires 21 of the energizing core cords 20 are preferably copper wires, having low electrical resistivity, and the core wires 31 of the reinforcing core cords 30 are preferably aramid wires, having the insulation property.

Furthermore, in the case in which the core wires 31 of the reinforcing core cords 30 have electrical conductivity, it is preferred that the core wires 21 of the energizing core cords 20 are copper wires coated with the coating film 22 having an insulation property, and the core wires 31 of the reinforcing core cords 30 are steel wires. Steel wires have high rigidity, and strength thereof can be maintained even when diameters thereof are small. These reinforcing core cords 30 can have a structure not having an insulating layer (coating film). Since the energizing core cords 20 have the coating film 22, even in a case in which steel wires not having an insulating layer come into contact with the energizing core cords 20, the electric signal or power function of the energizing core cords 20 is unlikely to be affected. Since the reinforcing core cords 30 thus do not need to be provided with an insulating layer and can have small diameters, spaces in a width direction in particular are not necessary. Therefore, when the core wires 31 of the reinforcing core cords 30 are steel wires, the strength of the belt 1 can be maintained while securing a broad region for disposing the energizing core cords 20. Thus, when the core wires 21 of the energizing core cords 20 are copper wires coated with the coating film 22 having the insulation property and the core wires 31 of the reinforcing core cords 30 are steel wires, an increase in the width of the belt 1 can be further inhibited while securing the necessary number of core cords as wiring for electric signals and power.

The lower limit of an average diameter of the reinforcing core cords 30 is preferably 0.1 mm, more preferably 0.2 mm, and still more preferably 0.5 mm. On the other hand, the upper limit of the average diameter of the reinforcing core cords 30 is preferably 2 mm, and more preferably 1 mm. When the average diameter of the reinforcing core cords 30 is less than the lower limit, the strength of the reinforcing core cords 30 may be insufficient. Conversely, when the average diameter of the reinforcing core cords 30 is greater than the upper limit, a weight of the belt 1 may become too heavy; flexural rigidity of the belt 1 may become too high, which may result in difficulty in wrapping the belt 1 around a pulley having a particularly small diameter; and/or a thickness of the belt main body 10 for covering the reinforcing core cords 30 may become too great.

Relationship between Energizing Core Cords and Reinforcing Core Cords

The average diameter of the energizing core cords 20 is preferably greater than the average diameter of the reinforcing core cords 30. When the average diameter of the energizing core cords 20 is thus greater than the average diameter of the reinforcing core cords 30, the electrical resistance per unit length of the energizing core cords 20 can be easily lowered. In particular, in the case in which the material of the energizing core cords 20 is the same as the material of the reinforcing core cords 30, when the average diameter of the energizing core cords 20 is greater than the average diameter of the reinforcing core cords 30, the electrical resistance per unit length can be lowered.

As shown in FIG. 3, four energizing core cords 20 and six reinforcing core cords 30 (may be also collectively referred to as "core cords") are aligned such that the shortest distance from the face on one side of the belt main body 10 to an outer periphery of the core cords has a certain value. When such an arrangement is employed, the belt main body 10 can be easily produced by extrusion molding while the ten core cords are supported from undersides thereof.

It is preferred that the core cords positioned on outermost sides in the width direction of the belt main body 10 are each the reinforcing core cord 30. The core cords positioned on the outermost sides in the width direction may have increasing electrical resistance over time due to, e.g., abrasion resulting from friction from side faces of the belt 1. Therefore, when the core cords positioned on the outermost sides in the width direction are each the reinforcing core cord 30 and are not used as wiring for electric signals or power, reliability of the wiring can be enhanced.

The lower limit of an average distance between central axes of the reinforcing core cords 30 disposed on the outermost sides and side faces of the belt main body 10 being adjacent thereto (may be also referred to as "average distance between the reinforcing core cords 30 and the side faces of the belt main body 10") is preferably 0.3 mm, and more preferably 0.5 mm. On the other hand, the upper limit of the average distance between the reinforcing core cords 30 and the side faces of the belt main body 10 is preferably 1 mm, and more preferably 0.7 mm. When the average distance between the reinforcing core cords 30 and the side faces of the belt main body 10 is less than the lower limit, at the time of production of the belt 1, the reinforcing core cords 30 disposed on the outermost sides may be exposed from the side faces of the belt main body 10. Conversely, when the average distance between the reinforcing core cords 30 and the side faces of the belt main body 10 is greater than the upper limit, side edges of the belt main body 10 may tend to rattle during driving, and an effect of improving driving accuracy by the reinforcing core cords 30 may be insufficient.

In the belt 1, as shown in FIG. 3, the reinforcing core cord(s) 30 is/are disposed between the energizing core cords 20 which are adjacent to each other. When the reinforcing core cord(s) 30 is/are thus disposed between the energizing core cords 20 which are adjacent to each other, strength of the belt 1 unevenly decreasing can be inhibited.

The arrangement of the energizing core cords 20 and the reinforcing core cords 30 is preferably symmetrical with respect to an axis centered on the length direction of the belt main body 10. The belt 1 is used while applying tension during driving, and when the energizing core cords 20 and the reinforcing core cords 30 are thus arranged symmetrically, the tension is uniformly applied with respect to the width direction of the belt main body 10, whereby tilting of the belt 1 during running can be prevented.

The lower limit of an average pitch P of adjacent core cords (refer to FIG. 3; an average distance in the width direction of the belt 1 between central axes of adjacent core cords) is preferably 0.3 mm, and more preferably 0.5 mm. On the other hand, the upper limit of the average pitch P is preferably 4 mm, and more preferably 1 mm. When the average pitch P is less than the lower limit, sufficiently securing the insulation property between the plurality of energizing core cords 20 may not be possible, and/or flexibility of the belt 1 may be insufficient. Conversely, when the average pitch P is greater than the upper limit, the belt 1 may become unduly large in the width direction, and/or the effect of improving the strength, durability, driving accuracy, and the like of the belt 1 by the reinforcing core cords 30 may be insufficient. It is to be noted that in a case in which the core cords are not disposed at sites which overlap with the belt hole(s) 11, the average pitch P between two core cords disposed so as to sandwich the belt hole(s) 11 therebetween is not limited thereto.

The average pitch P is preferably a certain pitch regardless of the combination of the types of the core cords (the energizing core cords 20 and the reinforcing core cords 30) which are adjacent to each other. In other words, the average pitch P is preferably equal regardless of the combination of the core cords which are adjacent to each other, including between the energizing core cords 20 which are adjacent to each other, between the reinforcing core cords 30 which are adjacent to each other, and between the energizing core cords 20 and the reinforcing core cords 30 which are adjacent to each other. When the core cords are thus disposed with equal pitches regarding of the types of core cords, the occurrence of rattling when the belt main body 10 is being driven can be inhibited. Furthermore, when the average pitch P is made equal, each core cord is subjected to a load uniformly; thus, early wire breakages and/or rises in electrical resistance of the energizing core cords 20 due to certain core cords being subjected to loads unevenly can be prevented. It is to be noted that "the average pitch P being equal" as referred to encompasses, in addition to a case of being completely equal, a case in which each average pitch P is held within a practical margin of error (for example, a margin of error of no greater than 5% from the central value).

Method for Producing Belt

The belt 1 can be produced by, for example, a production method including an extrusion molding step.

Extrusion Molding Step

In the extrusion molding step, an extrusion-molded body is formed, the extrusion-molding body having as a principal component a rubber or a resin composition in which the energizing core cords 20 and the reinforcing core cords 30 are embedded by extrusion molding.

Specifically, extrusion molding is performed by covering both ends of a plurality of core cords (the energizing core cords 20 and the reinforcing core cords 30) with the rubber or the resin composition in a melted state, while passing the plurality of core cords through a crosshead attached to a cylinder tip of an extruder. Alternatively, the plurality of core cords may be embedded in the rubber or the resin composition by using a pair of rollers to apply pinching pressure to the rubber or the resin composition, each being melt-molded, and the plurality of core cords.

In the extrusion molding, a heating temperature for melting the rubber or the resin composition depends on the type of the rubber or resin, whether a curing agent is used, and/or the like, and the lower limit of the heating temperature is preferably 150° C. On the other hand, the upper limit of the heating temperature is preferably 250° C. When the heating temperature is less than the lower limit, the rubber or the resin composition may not be sufficiently melted, and the extrusion molding may be difficult. Conversely, when the heating temperature is greater than the upper limit, the extrusion-molded body may become unduly hot, whereby a cooling time period may become unduly long and production efficiency of the belt 1 may decrease.

The belt 1 can be obtained by cooling the extrusion-molded product.

Advantages

Since the belt 1 involves the electrical resistance per unit length of the energizing core cords 20 being lower than that of the reinforcing core cords 30, the number of the energizing core cords 20 in parallel for securing the electrical resistance needed for energization can be reduced. Furthermore, the belt 1 enables maintaining strength mainly by means of the reinforcing core cords 30. Moreover, since in the belt 1, each distance D between the energizing core cords 20 and the periphery of the belt hole(s) 11 is no less than 0.5 mm, interference between the energizing core cords 20 and screw(s) which penetrate(s) the belt hole(s) 11 at a time of using the belt 1 is inhibited. Therefore, the desired electric current value can be easily secured in all of the energizing core cords 20, whereby effective functioning can be obtained. Thus, since the number of core cords needed can be reduced, the belt 1 enables inhibiting an increase in width while securing the number of core cords needed as wiring for electric signals and power.

Second Embodiment

Figure 4:
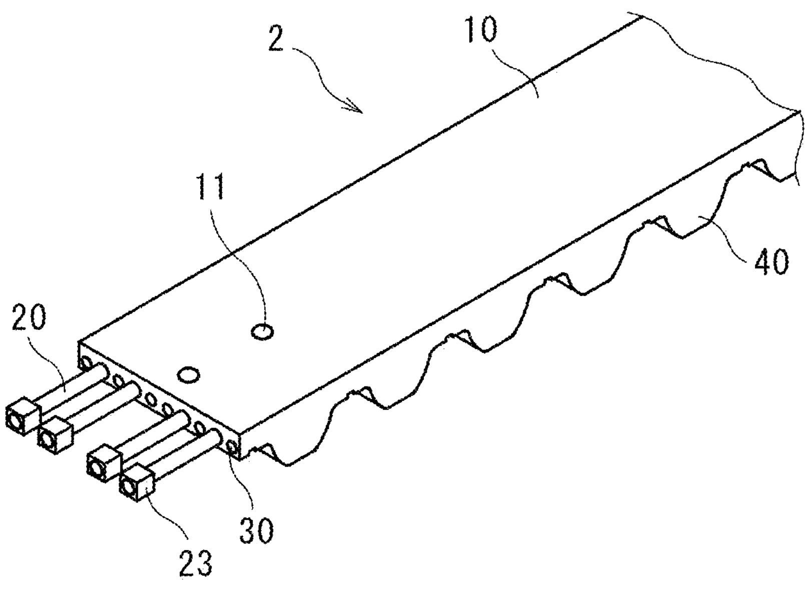
FIG. 4 is a schematic perspective view showing a belt according to an embodiment which differs from that shown in FIG. 1.

A belt 2 shown in FIG. 4 includes: a belt main body 10; a plurality of toothed portions 40 disposed at equal intervals in a length direction on one face of the belt main body 10; four energizing core cords 20 each containing a core wire 21 having electrical conductivity; and six reinforcing core cords 30 having an electrical resistance per unit length being greater than that of the energizing core cords 20, wherein the belt main body 10 has at least one belt hole 11 which penetrates the belt main body 10 in a thickness direction, the energizing core cords 20 and the reinforcing core cords 30 are embedded in the belt main body along the length direction of the belt main body 10 to be spaced apart in a width direction of the belt main body 10, and each distance D between the energizing core cords 20 and a periphery of the belt hole(s) 11 is no less than 0.5 mm.

The belt 2 can be constituted similarly to the belt 1 shown in FIG. 1 except for the toothed portions 40; thus, the same reference symbols are used and detailed explanations thereof are omitted. It is to be noted that in the belt 2, the belt hole(s) 11 may, as shown in FIG. 4, be provided between the toothed portions 40, or may be provided so as to penetrate the toothed portions 40. Furthermore, in a case of the belt main body 10 having a plurality of the belt holes 11, intervals between the belt holes 11 may, as shown in FIG. 4, correspond to intervals between the toothed portions 40, or may not correspond thereto.

Toothed Portions

Cross sections of the toothed portions 40 are protruding ridges which have a trapezoidal shape, a triangular shape, a semicircular shape, a mountain shape, a wave shape, a normal distribution curve shape, or the like. Furthermore, the toothed portions 40 are disposed such that ridge lines thereof (in an axial direction) correspond to the width direction of the belt main body 10.

An average height of the toothed portions 40 and pitch(es) of the toothed portions 40 are appropriately determined in accordance with an intended usage of the belt 2. The average height of the toothed portions 40 can be, for example, no less than 1.0 mm and no greater than 10 mm. Furthermore, the pitch(es) between the toothed portions 40 can be, for example, no less than 2 mm and no greater than 25 mm.

A principal component of the toothed portions 40 can be the same as that of the belt main body 10. Furthermore, the toothed portions 40 may contain additive(s) similar to that/those of the belt main body 10.

Advantages

The belt 2 can be suitably used as a toothed belt for which an energizing function is necessary.

Other Embodiments

The present invention is not limited to the above embodiments and may be carried out in various modified and improved modes in addition to the aforementioned modes.

In the above-described embodiments, the case of the belt of the present invention including four energizing core cords and six reinforcing core cords was taken as an example, but the cord numbers of the energizing core cords and the reinforcing core cords are not limited to the above description, and the belt may be constituted having any desired number of each, being one or a plurality. The cord number of the energizing core cord(s) is appropriately determined in accordance with the number of wiring lines for the electric signals and/or power needed, and the cord number of the reinforcing core cord(s) is appropriately determined in accordance with the strength needed for the belt.

In the above-described embodiments, the case of the energizing core cords having the coating film was described, but the coating film is not a necessary constitutive element, and the belt having the energizing core cord(s) each constituted from only the core wire also falls within the intended scope of the present invention.

In the above-described embodiments, the case of the energizing core cords each having the connector on at least one end side was described, but the belt wherein the energizing core cord(s) do(es) not have the connector also falls within the intended scope of the present invention.

In the above-described embodiments, the structure in which the reinforcing core cord(s) were disposed between the energizing core cords which are adjacent to each other was described, but the arrangement of the energizing core cord(s) and the reinforcing core cord(s) is not limited thereto. As in a belt 3 shown in FIG. 5, a structure in which a core cord group 24 is formed which includes a plurality of the energizing core cords 20 being adjacent in series can be employed. When the core cord group 24 is thus constituted, for example, a parallel connection for wiring which requires low resistance, such as, e.g., power wiring or the like, is facilitated. It is to be noted that the belt 3 can be constituted similarly to the belt 1 shown in FIG. 3 except for the core cord group 24 being formed; thus, the same reference symbols are used and detailed explanations thereof are omitted.

The number of energizing core cords 20 constituting the core cord group 24 is preferably no fewer than 2 and no more than 5. When the number is less than the lower limit, the core cord group 24 cannot be formed. Conversely, when the number is greater than the upper limit, the interval(s) between the reinforcing core cords 30 due to this core cord group 24 may become too large, whereby strength near the core cord group 24 may decrease.

It is preferred that an average interval between the energizing core cords 20 constituting the core cord group 24 is smaller than an average interval between the energizing core cords 20 and the reinforcing core cords 30. Furthermore, in a case in which the energizing core cords 20 are used in parallel with respect to the same signal, an average distance between the energizing core cords 20 constituting the core cord group 24 can be reduced; thus an increase in the width of the belt 3 can be further inhibited.

Figure 5:
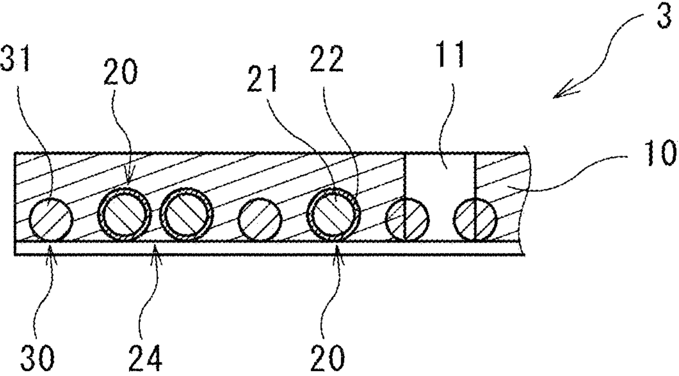
FIG. 5 is a schematic cross-sectional view of a belt according to an embodiment that differs from those shown in FIG. 3 and FIG. 4.

In the belt 3 shown in FIG. 5, a structure in which the core cord group 24 is disposed at one site is shown, but the core cord group 24 may be disposed at a plurality of sites. Furthermore, as shown in FIG. 5, independent energizing core cord(s) 20 not belonging to the core cord group 24 may be provided, or a structure in which all of the energizing core cords 20 belong to the core cord group(s) 24 may be employed.

INDUSTRIAL APPLICABILITY

The belt of the present invention enables inhibiting an increase in width while securing the number of core cords needed as wiring for electric signals and power.

EXPLANATION OF THE REFERENCE SYMBOLS

1, 2, 3 belt
10 belt main body
11 belt hole
20 energizing core cord
20*a* exposed portion
21 core wire
22 coating film
23 connector
24 core cord group
30 reinforcing core cord
31 core wire
40 toothed portion
D distance
P average pitch

The invention claimed is:

1. A belt, comprising:
a belt main body;
at least one energizing core cord comprising a core wire having electrical conductivity; and
at least one reinforcing core cord having an electrical resistance per unit length being greater than that of the energizing core cord,
wherein
a principal component of the belt main body is an elastomer,
the belt main body comprises at least one belt hole which penetrates the belt main body in a thickness direction,
the energizing core cord and the reinforcing core cord are embedded in the belt main body along a length direction of the belt main body to be spaced apart in a width direction of the belt main body,
each distance between the energizing core cord and a periphery of the belt hole is no less than 0.5 mm, and
the belt hole is provided on the reinforcing core cord so as to cut the reinforcing core cord.

2. The belt according to claim 1, wherein core cords positioned on outermost sides in the width direction are each the reinforcing core cord.

3. The belt according to claim 1, wherein
the belt comprises a plurality of energizing core cords as the at least one energizing core cord, and
the reinforcing core cord is disposed between the energizing core cords which are adjacent to each other.

4. The belt according to claim 1, wherein
the belt comprises a plurality of energizing core cords as the at least one energizing core cord, and
a core cord group is formed which comprises no fewer than 2 and no more than 5 of the energizing core cords being adjacent in series.

5. The belt according to claim 1, wherein
the energizing core cord comprises a coating film which constitutes a peripheral surface such that the core wire is coated, and
the coating film is not adhered to the belt main body.

6. The belt according to claim 5, wherein the coating film is constituted from an insulator.

7. The belt according to claim 5, wherein a melting point of a principal component of the coating film is higher than a melting point of a principal component of the belt main body.

8. The belt according to claim 5, wherein
a principal component of the coating film is a fluororesin.

9. The belt according to claim 1, wherein the belt main body comprises a flame retardant.

10. The belt according to claim 1, wherein the core wire of the energizing core cord is an annealed copper wire or a copper alloy wire.

11. The belt according to claim 1, wherein the core wire of the energizing core cord is a solid conductor, a bunch-stranded conductor, or a rope-stranded conductor.

12. The belt according to claim 1, wherein the energizing core cord is a shielded wire, a cable, or a shielded cable.

13. The belt according to claim 1, wherein the energizing core cord comprises a connector on at least one end side.

14. The belt according to claim 1, which is a flat belt.

15. The belt according to claim 1, which is a toothed belt comprising a plurality of toothed portions disposed at equal intervals in the length direction on one face of the belt main body.

* * * * *